Figure 1:
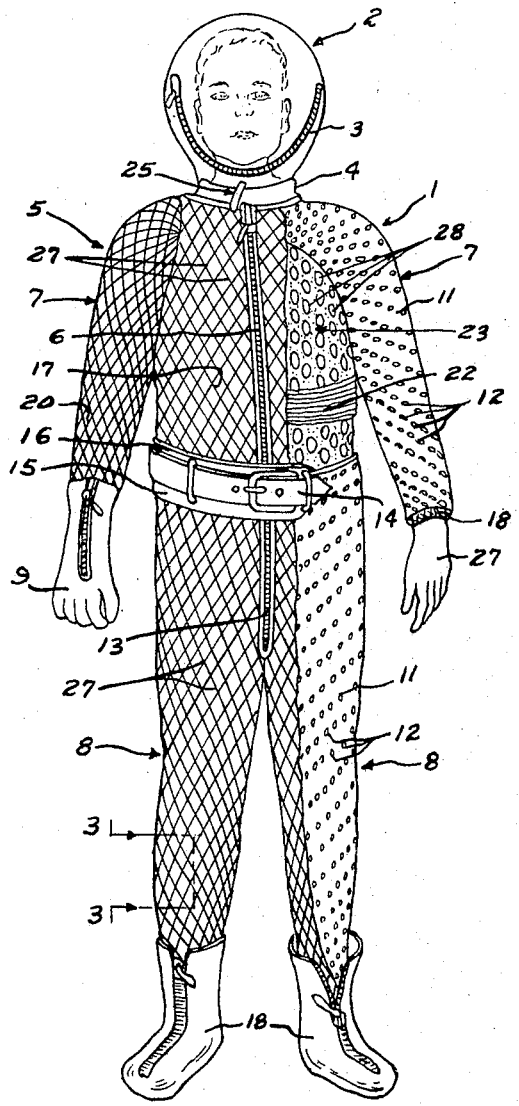

Feb. 25, 1969     O. SCHUELLER     3,428,960
MULTICELL PRESSURE SUIT

Filed June 3, 1965                                                          Sheet  /  of 5

INVENTOR
*OTTO SCHUELLER*

BY

*Harry A. Herbert Jr.*
*Charles H. Wagner*
ATTORNEYS

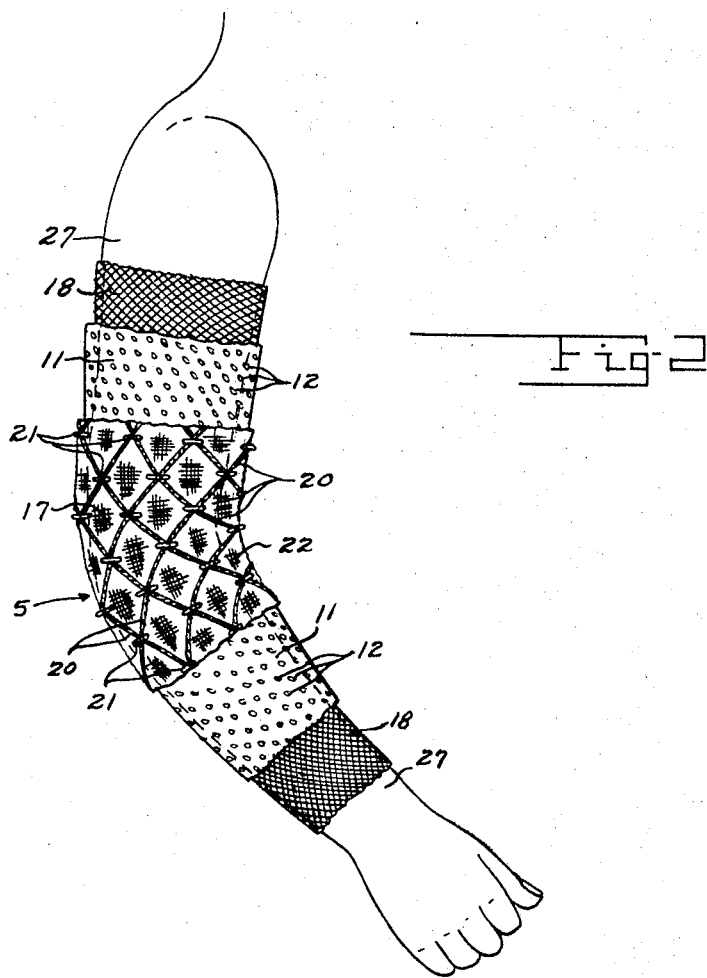

Feb. 25, 1969     O. SCHUELLER     3,428,960
MULTICELL PRESSURE SUIT
Filed June 3, 1965     Sheet 3 of 5
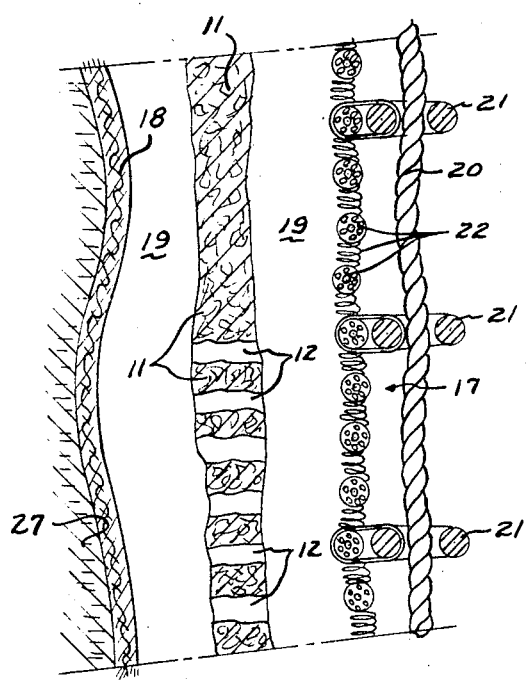
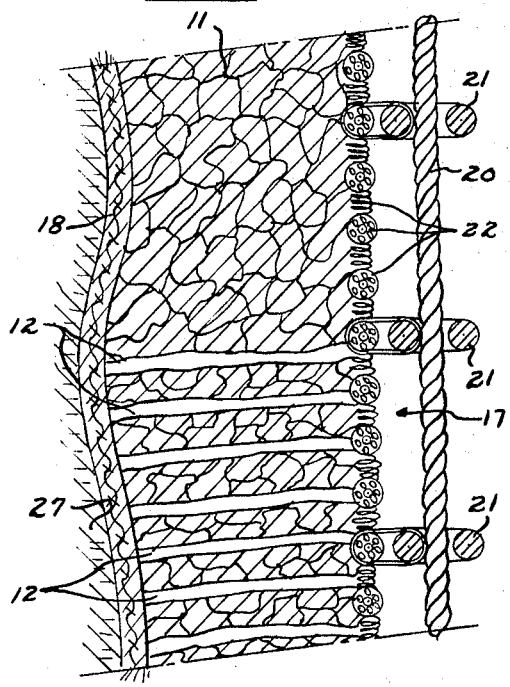
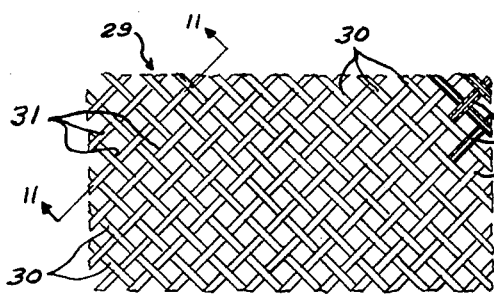
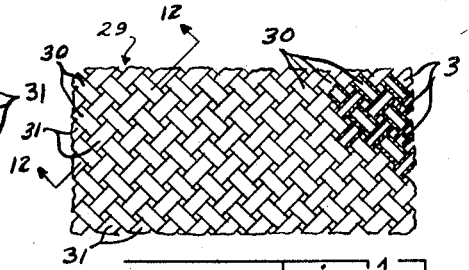
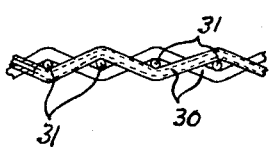
INVENTOR
OTTO SCHUELLER
BY
ATTORNEYS

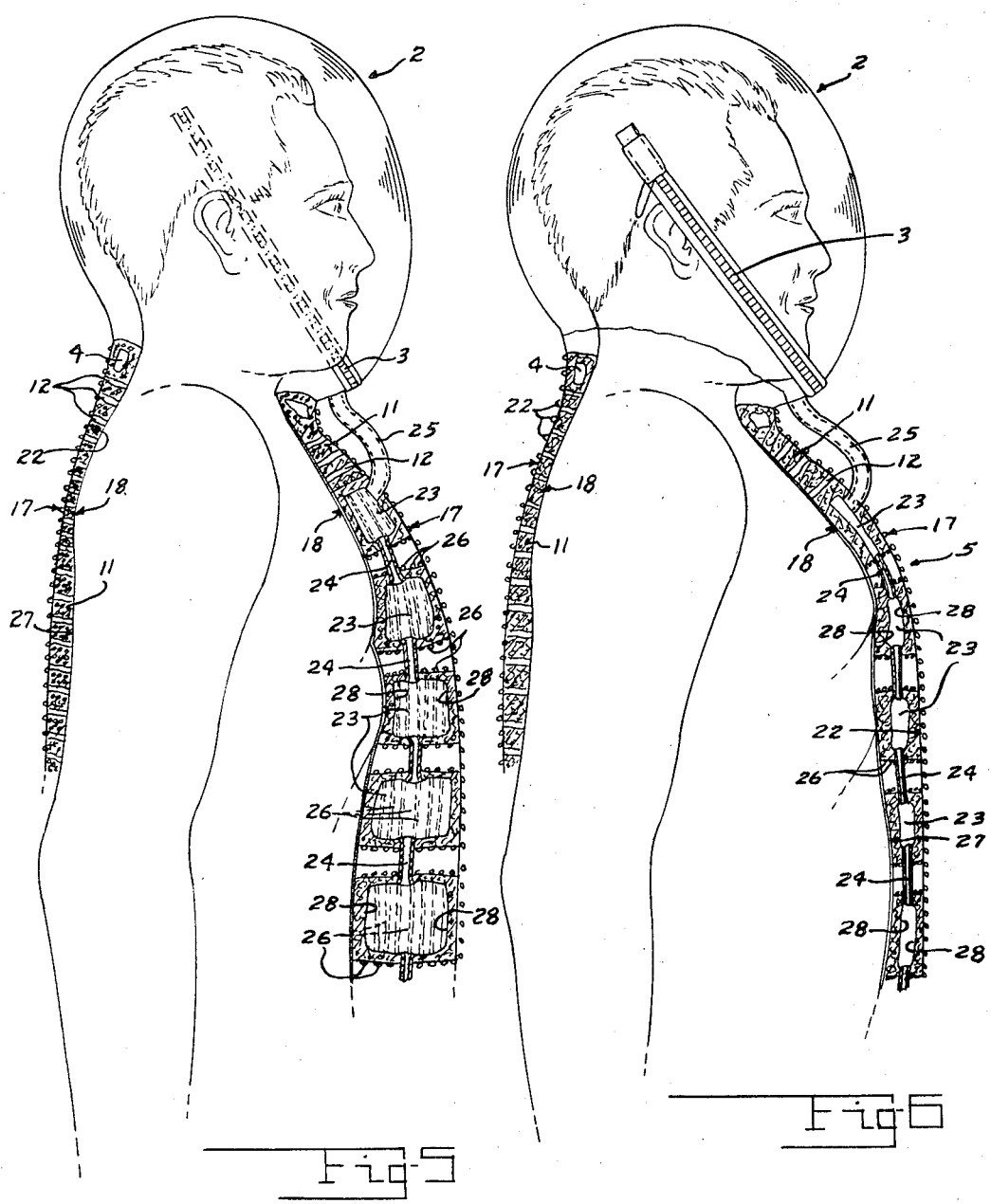

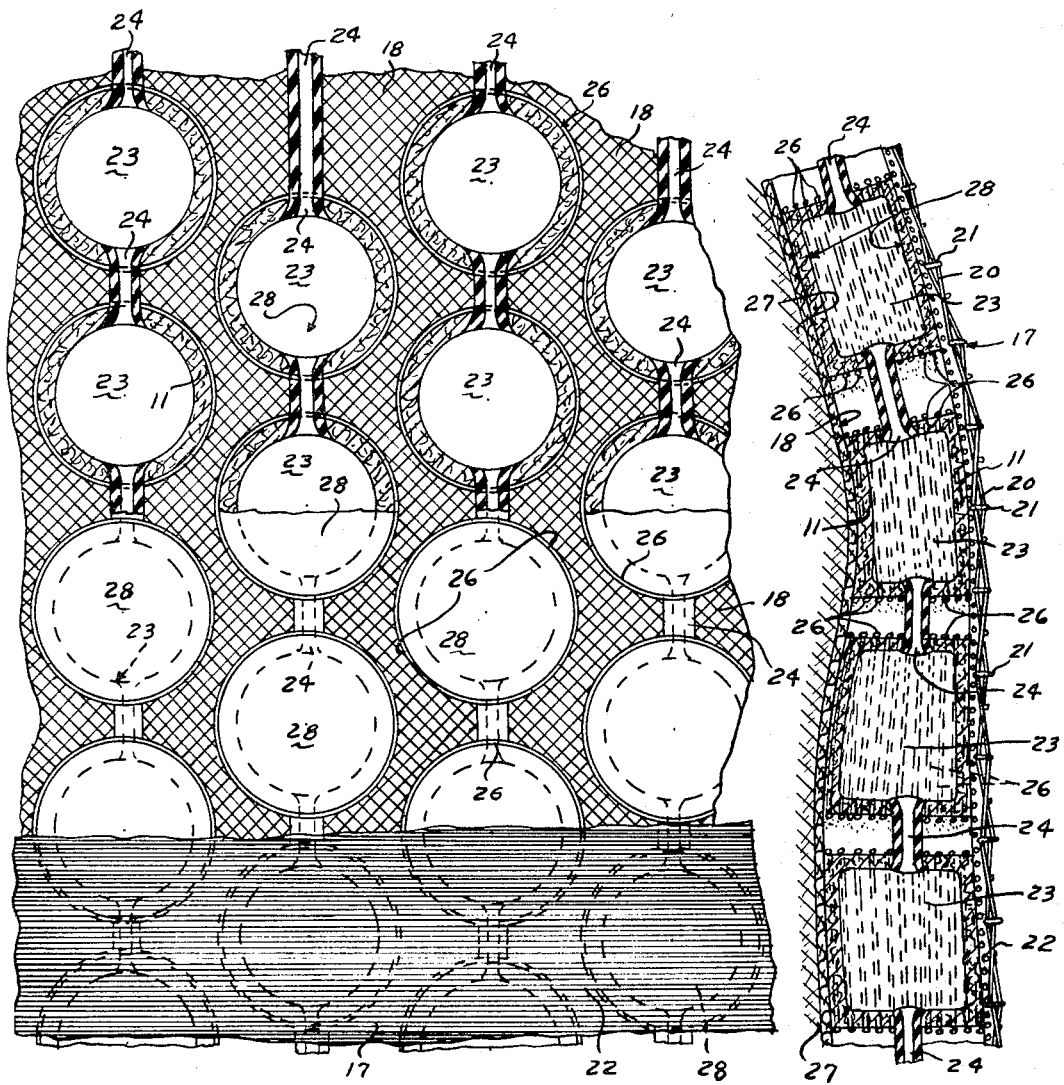

United States Patent Office 3,428,960
Patented Feb. 25, 1969

3,428,960
MULTICELL PRESSURE SUIT
Otto Schueller, Dayton, Ohio, assignor to the United States of America as represented by the Secretary of the Air Force
Filed June 3, 1965, Ser. No. 461,212
U.S. Cl. 2—2.1          14 Claims
Int. Cl. B63c 11/06

The invention described herein may be manufactured and used by or for the United States Government for governmental purposes without the payment to me of any royalty thereon.

This invention relates to improvements in pressure suits, primarily for use at high altitudes where the air density and pressures are or may be very thin and low, having for an object the provision of a continuous wear pressure suit for intra- and extra-vehicle use in aerospace missions which is simple, comfortable to wear, extremely flexible at normal or lower altitudes, and under what is commonly known in space vehicles and satellites at high altitudes as under "skirt sleeve conditions."

A further object of the invention is the provision of a pressure suit which is comfortable to wear under the aforesaid "shirt sleeve conditions" in space vehicles at high altitudes, but is automatically pressurized upon predetermined further reductions in pressures exterior of the suit, without the employment of exterior inflation means or apparatus, in which the pressurized suit condition is automatically relieved or eliminated upon return to normal low altitudes, or on the ground, or where the "shirt sleeve" pressure conditions are restored.

A further object is the provision of a pressure suit or garment which is adequately ventilated under both pressurized and unpressurized conditions without the employment of additional air circulation or ventilating (or air conditioning) apparatus, but is instantly and automatically pressurized upon a predetermined degree of reduction in air pressure exteriorly of the suit, such as a sudden decompression in the space vehicle in which occupant of the suit is located or working.

Currently there are two general types of pressure suits, the full pressure suit, and the partial pressure suit.

The present or conventional full pressure suits are impermeable to air and moisture, requiring an artificial or separate ventilating system to maintain the metabolic heat balance and to remove sweat. A puncture of the gas pressure bag renders them ineffective. The same is true for the inflatable bladder type suits.

The conventional partial pressure suits on the other hand, which are permeable to air and moisture require a straitjacket type of individual fitting and, even under the best conditions of adjustment, are tight and uncomfortable and provide nonuniform counter pressures to or on the body. This invention corrects, or at least vitally improves these and other deficiencies of present pressure suits by incorporating the following principles and structures:

A collapsible bladder is employed which consists of a multicellular structure, for example, a special kind of closed microcell or millicell foam material such as rubber which is disposed between an outer restrictive, preferably porous, flexible garment and an inner porous under garment or layer, next to the wearer's skin or under garments. The essence of the invention is that the millicells are originally filled with gas or air at a predetermined very low pressure so that their volume is greatly reduced by exterior pressure under normal atmospheric pressure and under the spacecraft "shirt sleeve environment" pressures, and the cell membranes are still relaxed or not put under tension in the case of cabin decompression or extravehicular use, such as in space outside of the space vehicle, or in the air ship cabin should it become subject to decompression. This is because the cells then expand approaching their normal original volumes that were present at the time the multicell sponge bladder material was made, namely under very low atmospheric or gas pressure conditions. This expansion of the core or cell volumes, because of material reduction or lack of exterior air pressure, cause the flexible resilient sponge material bladder, between the body of the wearer and the outer restraining garment, to swell or expand to supply the required constraining inward pressure on the wearer's body, when subjected to the low or zero exterior pressures, yet when the proper or desired exterior air pressure on the garment is restored the cells are again compressed to cause a material reduction or shrinking in the size or thickness of the bladders, and the exterior restraining garment again becomes slack and extremely comfortable on the wearer. The millicell bladder material is therefore never put under tension, only compression on normal air breathing pressures.

Another essential improvement is the provision for adequate ventilation of the interior of the suit or garment. Since the single cells or groups of millicells are independent of each other in the foam bladders, so to speak, the bladder material may be closely perforated by providing closely spaced pores or holes therethrough so that the bladder becomes permeable to air and moisture at all times, and by employing a soft flexible porous outer restraining or constricting garment and a porous inner garment or layer (next to the skin of the wearer) the suit is effectively ventilated for the removal of air, heat, and sweat from the wearer at all times, to maintain the desired metabolic heat balance.

Another improvement is in the chest breathing bladder structure which is also made permeable to air and moisture in like manner by dividing it into a number of much larger independent flexible compartments which are lined with or formed in the millicell chest bladder structure and interconnected to each other by tubular communicating conduits or passages, whereby the millicell sponge material may be arranged between compartments perforated by a multitude of small ventilation holes or pores extending from the exterior of the chest portion to the inner (next to the chest) portion around the compartments. These chest compartments, or groups of compartments, of course, being connected directly or through a pressure regulator, with or to the interior of the helmet, when the helmet is closed and in use under normal low or subatmospheric pressure breathing conditions.

A further and alternate form of the invention is the provision of a space suit outer garment or underwear composed of woven hollow flexible fine tubular cell members of soft resilient material in which the tubular material is the form of fine hollow tubular threads which are originally filled with air or gas at or under very low pressure, like the millicell foam material, and sealed in intervals or sections, and woven in an open mesh weave, therefore being a porous woven, very flexible, comfortable to wear garment or space suit on the ground or under the "shirt sleeve environments," and provides ventilation and heat escape at normal outside atmospheric pressures, but as the exterior pressure drops below the desired intended pressures the gases or air trapped inside the tubular cells of the threads expands to swell the threads and close or tend to close and reduce the size of the ventilation opening in the pores of the garment between the threads and affords greater internal skin support for the wearer. This also causes a shrinking or constriction of the garment on the wearer under abnormal low exterior pressure conditions automatically.

The tubular threads must, of course, be sealed when under low pressure to maintain the low gas or air pressures therein, possibly by heat welding of the thread material in regular intervals or in the final fabrication of the garment.

Other objects and advantages of the invention will become apparent from the following description and accompanying drawings in which like reference characters refer to like parts in the several figures.

DRAWINGS

FIG. 1 is a somewhat schematic front elevation of a continuous wear pressure suit incorporating the invention, with part of the outer porous restraint garment in the right-hand side of the figure broken away to show intermediate ventilated multi or millicell expansible foam bladder layer with the chest compartment portions and the intermediate ventilation openings or passages through the expansible foam bladder portions, somewhat exaggerated.

FIG. 2 is an enlarged fragmentary detail view of a limb portion, for instance the arm enclosure portion of a pressure suit similar to that shown in FIG. 1, showing the porous inner layer, the intermediate porous low pressure multicell foam material such as sponge rubber which is automatically expansible, and the outer nonexpansible and nonextensible porous restraining garment, broken away in step-down fashion.

FIG. 3 is a greatly enlarged, somewhat schematic fragmentary longitudinal sectional view, for instance, about on line 3—3 in FIG. 1, showing the soft flexible resilient multicell foam material or foam rubber bladder in its normal fully relaxed condition, such as would be the case under normal atmospheric conditions, such as on the ground, or in a "shirt sleeve environment" in a space vehicle, also clearly illustrating the ventilation holes or pores through the multicell bladder, and also showing the exterior porous confining or restraining garment fully relaxed, to provide maximum flexibility and comfort to the wearer.

FIG. 4 is a similar schematic fragmentary sectional view, for instance about on line 3—3 of FIG. 1, but showing the fully expanded condition of the multicell foam bladder, such as would occur upon a predetermined reduction in exterior pressure, with the expanded bladder restrained by the outer restraint garment to exerting inward holding pressure through the inner porous garment onto the skin surface of the wearer, the bladder also providing the necessary restraining support on the non-uniform contours in the wearer's body. The ventilation passages or pores while smaller, are still operative.

FIGS. 5 and 6 are somewhat similar enlarged schematic sectional views through the chest portion of a pressure suit embodying the invention, showing the multicell structure of the breathing bladder in its expanded condition, such as would be the case when breathing in outer space and at super altitude (for example less than 3 p.s.i. exterior pressures) showing the communicating conduits between the large air breathing compartments or cavities, FIG. 5 showing the beginning of the inhalation cycle, while FIG. 6 illustrates (schematically) the inhalation cycle.

FIGS. 7 and 8 are further enlarged schematic fragmentary sectional views taken at right angles to each other, showing the chest breathing bladder in more detail with the low pressure millicell foam material as wall material of the large chest bladder compartments.

FIGS. 9 and 10 are fragmentary detail enlarged schematic views of a small portion of a pressure or space suit material, illustrating a further embodiment of the automatic pressurizing and ventilating tubular millicell-thread garment, FIG. 9 illustrating the woven pressurizing cloth of the garment in normal "shirt sleeve environmental conditions," while FIG. 10 shows the same under abnormal low or decompression pressure conditions.

FIGS. 11 and 12 are cross sectional views taken about on lines 11—11 and 12—12 respectively in FIGS. 9 and 10.

Referring to the drawings, and more particularly to FIG. 1 the reference numeral 1 denotes a pressure suit incorporating the invention, in which 2 denotes a helmet, preferably of the soft transparent collapsible inflatable type having an opening pressure sealing zipper 3 and a suitable neck seal 4 schematically shown more particularly in FIGS. 5 and 6.

The pressure suit 1 includes an upper garment or jacket 5 of flexible but nonexpansible porous material having a comfortable fit and may be fabricated from suitable loosely woven nonstretchable material such as nylon, forming a constrictive upper outer garment provided with a conventional zipper closure 6.

The outer flexible nonexpansible portion of the suit 1 includes the sleeves 7, and the lower or trouser portion 8.

The lower or outer ends of the arms and legs are confined in suitable gloves 9 and boots 10, which, if desired, may be porous and lined with this low pressure millicell material indicated generally at 11, having suitable thickness and provided with ventilation pores or passages 12. The lower or trouser portion of the suit is closed in the conventional way by a zipper 13.

The jacket portion 5 may be tucked into the trouser section 8 in the conventional manner, held in place by the belt 14. If desired the jacket and trouser waist portion may be releasably connected together at their overlap by conventional hook and pile tapes 15 and 16. These hook and pile overlapping tape connectors may if desired also be provided between the extremities of the sleeves and leg portions of the garment and the gloves 9 and boots 10.

A limited and adjustable elasticity may be built into the jacket-trouser, arm-glove, and leg-boot connections exerting if desired a continuous and adjustable force on the body and its extremities thus compensating to a certain extent for the lack of gravity and counteracting the weakening effects of weightlessness in space.

Since there is no appreciable inside or inflation gas pressure within the suit there is little or no necessity for air seals in the zippers 6 and 13 or between the sleeves and gloves 9, and bottom of the trousers and the shoes or boots 10.

This arrangement makes the space suit 1 very easy convenient and quick to put on or take off.

Referring now to the enlarged sectional views shown in FIGS. 3 and 4 which show respectively, a section through the millicell pressure suit in a normal ground or low altitude atmosphere of 760 mm. Hg (14.7 p.s.i.) or "shirt sleeve environment" while FIG. 4 illustrates the same under very low atmospheric pressure, for instance, approaching, or at zero mm. Hg (0 p.s.i.), with the millicell structure or bladder expanded toward its substantially relaxed initial condition and thickness but confined by the flexible but nonexpansible porous outer garment layer or structure 17, thus causing the increase in thickness of the foam layer 11 due to the return of the cells toward substantially their normal relaxed size and shape, to exert the desired inward holding pressure, for instance, not less than about 190 to 260 mm. Hg (3.7 to 5 p.s.i.) on the outer surface or skin of the wearer of the suit, corresponding to or balancing the breathing pressure within the lungs.

If desired the suit 1 may be provided with a soft thin porous flexible inner liner of suitable woven, and possibly absorbent, material indicated generally 18.

It will be observed, on an enlarged scale in FIGS. 3 and 4, that sufficient space 19 may be provided between the outer porous confining garment layer or structure 17 and the inner porous layer 18 when the millicell layer 11 is compressed by atmospheric air pressure at lower altitudes, on the ground, and in the so called "shirt sleeve environments," that the outer garment 17 is fairly loose or slack, comfortable and not being under tension may be very flexible and easy to wear, but upon decompression the cells in the intermediate foam bladder 11 expand to provide the desired confining pressure automatically over the surface of the wearer's body, conforming, to a very great extent, to uneven contours of the surface.

If desired the outer restraining garment or layer 17 may be suitably reinforced by a crisscross interlaced self-adjusting cable network 20 slidable in suitable eyelet 21 secured to the woven porous outer garment layer indicated more specifically at 22 (in FIGS. 2, 3 and 4).

As seen in FIGS. 5 to 8 the chest breathing bladder portion is schematically shown in more detail and consists of a number of relatively good size cylindrical compartments 23 built of or in the low pressure closed millicell sponge material 11 and connected together by the communicating passages or tubes 24. Single groups of the compartments 23 may be inflated from a manifold through valves (not shown) which could be closed in case of a local puncture, to prevent a blow-out of the whole bladder. The groups of the compartments 23 are, of course, connected, for instance by the flexible inhale and exhale communicating conduit or conduits 25 to the interior of the helmet 2 (when closed) to compensate for chest expansion and contraction when the wearer is breathing, for instance, oxygen, from a conventional oxygen supply device (not shown).

Still referring to FIGS. 5 to 8 the cylindrical compartments 23 may be restrained by surrounding cords or threads 26 so that they can expand only between the skin 27 or the under garment or inner layer 18 and the outer restrain layer 22 (or 22 plus 20).

The compartments or chambers 23 are provided with end disks 28 which could be bonded to the inner layer or porous liners 18 of the garments, while the outer end disks or closures 28 of the compartments 23 may be connected or bonded to the outer porous restraint layer 22 of the garments.

In FIG. 7 the area of the inner layer 18 between the compartments 23, which is shown cross-hatched, may be fully permeable to air and moisture.

The chest breathing bladder portion shown in FIGS. 5 to 8 is given, for example only, as the restraint cords or threads 26 around the compartments 23 could be omitted to permit expansion in all directions, if a greater reduction or even closing of the permeable area in a vacuum environment is desired. The design could be inversed, namely the bladder could be provided by circular holes separated by ribs (not shown). The bladder portion would then have a form like the crisscross hatched area in FIG. 7, or a simple single bladder section without compartments could be used.

A modification of a multicellular structure, as shown schematically in FIGS. 9 to 12 may be employed for the inner layer or the underwear, or in the outer restraint garment, or both, and still maintain the desirable features of a pressure suit which is fairly loose, comfortable, and fully porous or vented in normal atmospheric pressures, and in the "shirt sleeve environments," but would instantly and automatically function to provide the desired restraining or confining pressure on the wearer's body in a very low exterior pressure drop or decompression of a spacecraft which contained the wearer.

In this form of invention the inner, or the outer restraint garment, a portion shown in greatly enlarged scale being indicated at 29 is woven, perferably loosely woven, from substantilally nonextensible small flexible expansible tubular cell members or threads 30 and 31 which are closed or sealed with a balanced inside pressure in a low pressure atmosphere for instance 3 p.s.i., so that the woven material or cloth in the low pressure balanced interior and exterior atmosphere or pressure would be fairly thick with little or no porosity or openings between the tubular gas or air filled threads, as seen in FIGS. 10 and 12. However, when the material becomes subject to increased, atmospheric exterior pressures, such as on the ground, or the "shirt sleeve environments" the external pressure ratio to the internal trapped air or gas pressure in the elongated cells causes the threads to be compressed or shrink and become much smaller with larger openings or pores between the woven threads to provide increased porosity and ventilation as seen in FIGS. 9 and 11. Also, since the restraining material becomes relatively thinner there is some elongation or stretch in the plane of the woven material which would loosen or cause slack in the enclosing restraining garment on the outer surface of the wearer, subject however to immediate automatic contraction, with closing or reduction in the porosity, as seen in FIGS. 10 and 12, upon decompression or very low, or zero exterior pressures on the material.

In conclusion, when the foam rubber is prepared or the tubular threads are sealed at a low atmospheric pressure and a higher temperature, for example at 150 mm. Hg (approximately 3 p.s.i.) and 130° C. (266° F.), the gas pressure within the cells in the "solidification" or curing stage will also be only 150 mm. Hg (3 p.s.i.). If and when this material is then cooled to room temperature 20° C. (68° F.) and brought under normal atmospheric pressure of 760 mm. Hg (14.7 p.s.i.) the gas in the cells will be compressed and the cell volumes reduced in accordance to the gas law: $pV=RT$, which gives a reduction to approximately one-seventh of the original volume, causing the foam rubber or tubular cell material to collapse or shrink and no stress on the cell membranes is present. The shrinking of the porous material provides comfortable slack in the outer restraining porous garment 1 as seen in FIG. 3, and FIGS. 9 and 11, on an enlarged scale. This being the condition on the ground and at lower or in "shirt sleeve environments."

An expansion ratio of 1:7 is now available before stress and strain will occur in the cell membranes and ribs. Since spacecraft "shirt sleeve" environments may be about 5 to 7 p.s.i. the cells are not fully expanded and the garment is still comfortable. However, upon full decompression the cells will expand (due to lack of exterior pressure) and provide the necessary confining counterpressure on the surface or skin 27 of the wearer. The outer permeable restraint layer 22 prevents unlimited circumferential expansion of the multicell bladder 11 but may permit longitudinal extension to facilitate joint mobility, while the sliding self-adjusting cord and cable restraint system 20 guided by the rings or loops 21 (see FIG. 2) prevents unlimited longitudinal extension without restricting joint flexing.

The usual operational oxygen pressure in pressure suits is about one-fourth of an atmosphere (190 mm. Hg=3.7 p.s.i.)

An expansion of the bladder 11 from 14.7 to 3.7 p.s.i. or a ratio of 1:4 therefore can be utilized.

If the cabin pressure is 7.5 p.s.i. an expansion from 7.5 to 3.7 p.s.i. or a ratio of 1:2 is still available to tighten up the suit in the case of atmosphere decompression. The bladder 11 and restraint garment 17 will be adjusted so that the gas pressure within the cells approximately balances the breathing pressure which is transferred by the body fluids from within the lungs to the skin as indicated in FIG. 4. Further individual adjustment for personal comfort can be achieved by regulating the breathing pressure within certain limits.

An extremely accurate adaptation of the bladder 11 to irregular body forms is not necessary since the cell membranes are relaxed and the gas pressure within the cells is transferred, so to speak, uniformly through the whole bladder as if the cell membranes did not exist. Therefore, since the bladder surface layer is also relaxed the bladder adapts itself within a certain range to uneven and irregular body contours and configurations.

I claim:
1. In a pressure suit for use in low to zero exterior pressure environments, a comfortable form fitting garment adapted to fit and enclose a wearer in close slack condition relative to the exterior surface of the wearer, on the ground and in predetermined normal altitude pressure conditions such as in a "shirt sleeve" environment in a space vehicle comprising, an expandable and contractible resilient flexible multicellular material having a gaseous fluid medium filled and sealed therein at an absolute pressure substantially below 7 p.s.i., said multicellular material being automatically expansible by the sealed gaseous pressure therein to constrict the suit against the outer surface of the wearer when the suit enclosing the wearer is subjected to exterior surrounding pressures of less than said filling and sealing pressure, said material being contractible by increasing exterior pressures thereon above said filling and sealing pressure to shrink said multicellular material by compression of the sealed gaseous pressure fluid medium therein to relieve the constricting pressure of the material of the suit on the surface of the body of the wearer in altitude environments at a pressure of more than said filling and sealing pressure.

2. A millicellular pressure suit for use in low to zero exterior pressure environments comprising a soft flexible inner form-fitting garment, an outer flexible nonexpansible enclosing constricting garment surrounding the inner garment in slack predetermined spaced condition, and an intermediate flexible resilient expandable bladder of foamed flexible millicell resilient material enclosing said inner garment in loosely disposed relation to the outer constrictive garment having a gaseous fluid medium filled and sealed therein at an absolute pressure of less than 7 p.s.i., having a greater thickness, when subject to pressure less than said sealing pressure, than the space between the inner garment and the outer constricting garment, for exerting inward constricting pressure of the outer garment on the inner garment and the surface of the wearer thereof, and compressible by external pressures exceeding said sealing pressure to a thickness less than the space between the inner garment and the outer constrictive garment to relieve the constrictive pressure of the outer garment on the inner garment and the skin of the wearer thereof.

3. In a pressure suit for use in low to zero exterior pressure environments, a comfortable form fitting nonextensible constrictive flexible garment adapted to fit a wearer thereof in close slacked condition relative to the exterior surface of the wearer's body in predetermined normal exterior altitude pressure conditions such as in "shirt sleeve" environments in a space vehicle and on the ground comprising, an expansible and contractible multicellular resilient flexible material having a gaseous fluid medium trapped and sealed therein at an absolute pressure below 7 p.s.i., said multicellular material being expansible toward its initial condition against the outer surface of the wearer's body by expansion of the gaseous fluid medium sealed therein when the suit containing the wearer is subjected to less than said sealing pressure, and contractible by compression of the gaseous fluid medium sealed therein by exterior pressures above said sealing pressure to automatically contract said multicellular material to shrink the same to provide slack in the said material, to relieve the said confining pressure thereof on the surface of the body of the wearer.

4. In a ventilated woven multicellular flexible pressure suit for use in normal ground pressure atmospheres, in "shirt sleeve" environments in space vehicles, and in very low to zero exterior atmospheric pressure environments comprising a woven form-fitting nonexpansible constricting garment adapted to fit a wearer in close slacked condition to the surface of the wearer's body in predetermined normal exterior altitude pressure conditions above 7 p.s.i., such as in said "shirt sleeve" environments in a space vehicle, and on the ground, comprising an expansible and contractible porous fine closely woven tubular thread multicellular material having a gaseous fluid medium trapped and sealed therein at an exterior pressure less than 7 p.s.i., said tubular threads being substantially nonextensible but compressible by exterior surrounding pressures above said trapping and sealing pressures to compress the trapped gaseous fluid medium therein to shrink said threads of the woven multicellular material for slacking the suit to automatically relieve the constrictive pressure thereof on the body of the wearer and increase the area of the pores between the shrunken tubular threads of the material of the suit to provide increased ventilation through the suit and predetermined slack therein for the wearer's body when subjected to increased exterior atmospheric pressures above said trapping and sealing pressure.

5. A ventilated pressure suit or garment for use in normal ground pressure atmospheres, in "shirt sleeve" environments in a space vehicle, and in very low to substantially zero pressure atmospheres in space comprising, an outer comfortable flexible form-fitting substantially nonextensible and nonexpandable constructive porous garment for enclosing a wearer in closely spaced comfortable slack condition relative to the surface of the body of the wearer, a flexible resilient microcellular low pressure gas filled foamed bladder secured within said outer porous comstrictive garment, adapted to be disposed between the same and the surface of the body of the wearer having a thickness in normal atmosphere presssures on the ground and in said "shirt sleeve" environments in a space vehicle at more than said low gas filling pressure which is less than the space between the inner surface of the outer constrictive garment and the outer surface of the wearer's body, and automatically increased thickness in excess to space between the interior of the outer constrictive garment and the body of the wearer when exposed to low exterior pressures less than said low gas filling pressure for transferring the constrictive effect of the outer garment to the surface of the body of the wearer at exterior pressures less than said low gas filling pressure, said porous microcellular foamed bladder having a gaseous fluid medium trapped and sealed therein and cured at an exterior pressure less than 7 p.s.i., whereby the foamed resilient cellular material substantially retains its maximum thickness in exterior pressures below said trapping and sealing pressure and is automatically reduced in thickness due to compression of the gas therein in rising exterior pressures above said trapping and sealing pressures to take up slack in the constrictive garment and transfer the constricting pressure of the outer garment to the surface of the body of the wearer in lowering exterior pressures below said trapping and sealing pressures.

6. A millicellular porous ventilated pressure suit for use in low to zero exterior pressure environments, and in normal pressure atmospheres on the ground and in "shirt sleeve" environments in space vehicles comprising, a soft flexible porous ventilating inner form fitting garment, an outer porous flexible nonexpansible enclosing constricting garment surrounding the inner porous garment in predetermined closely spaced slack condition, and an intermediate flexible resilient porous expandable bladder of foamed flexible millicell resilient material enclosing the inner garment in loosely disposed relation to the outer constricting garment having a gaseous fluid medium filled and sealed therein at a predetermined low exterior pressures of less than 7 p.s.i., having a multitude of closely spaced ventilation pores or passages therethrough, said porous bladder having a greater thickness than the space between the ventilated porous inner garment and the ventilated porous constricting outer garment when subject to pressure less than said sealing pressure for exerting inward constricting pressure of the outer constrictive garment on the inner garmene and the surface of the body of the wearer, and compressible by external pressures exceeding substantially said sealing pressure by compression of the gaseous fluid pressure medium sealed in the millicells of the bladder material surrounding the pores to a thickness less than the space between the inner porous garment and the outer constricting garment, to provide comfort and slack in the suit when subjected to exterior pressures greater than said sealing pressure.

7. The method of forming and fabricating a pressure suit for use in normal pressure altitudes, on the ground, in "shirt sleeve" environments in a space vehicle, and in very low to zero pressure altitudes in space comprising, fabricating an outer form fitting confining garment for fitting a wearer in closely spaced slack and comfortable relation to the outer surface of the wearer's body, fabricating an inner resilient liner within said outer garment for snugly fitting the wearer's body in inwardly spaced relation to said outer confining garment, fabricating and inserting an intermediate millicell resilient sponge bladder between the inner liner and the outer constrictive garment comprising resilient sponge-like material having a gaseous fluid medium filled and sealed therein an exterior pressure less than 7 p.s.i., having a thickness at said sealing pressures greater than the space between the inner liner and the confining outer garment, for transferring the confining pressure from said confining outer garment through the intermediate millicell bladder and said inner liner to the surface of the body of the wearer when in exterior pressure environments less than said filling and sealing pressure, whereby increase in the surrounding exterior pressures above said filling and sealing pressure compresses the sealed gaseous fluid medium in the millicells to reduce the thickness of said millicell bladder to less than the space between the outer and inner garments to reduce or eliminate the transfer of said confining pressure of said outer garment on the inner liner and surface of the body of the wearer.

8. The method of forming and fabricating a porous pressure suit for use in normal pressure altitudes, on the ground, in "shirt sleeve" environments in a space vehicle, and in very low to zero pressure altitudes in space comprising: fabricating an outer porous nonexpandable form fitting constricting garment to fit a wearer in closely spaced slack and comfortable relation to the outer surface of the wearer's body, fabricating an inner porous resilient liner within said outer garment for snugly fitting the wearer's body in predetermined inwardly spaced relation to said outer porous garment, inserting a resilient sponge bladder between said inner porous liner and said outer porous constrictive garment having a gaseous fluid medium filled and sealed therein at an exterior pressure less than 7 p.s.i., having a thickness at said sealing pressures greater than the space between the inner liner and the outer garment, for transferring the confining pressure of said outer garment through said intermediate bladder and said liner to the outer surface of the body of the wearer in exterior pressure environments less than said filling and sealing pressure, whereby increase in the exterior pressure above said filling and sealing pressure compresses the sealed gaseous fluid pressure medium in said bladder to reduce the thickness of said intermediate bladder to reduce or eliminate the transfer of said confining pressure of said outer garment on the inner liner and surface of the body of the wearer.

9. The method of fabricating a pressure suit for comfortable use in normal altitude pressures, on the ground, in "shirt sleeve" environments in a space vehicle, and when exposed to very low to zero exterior pressures in space comprising: fabricating an outer porous constricting garment for enclosing a wearer in predetermined spaced slack and comfortable relations to the outer surface of the wearer's body, fabricating and inserting a foamed resilient sponge-like bladder liner within the confining outer garment comprising millicells distributed substantially throughout having a gaseous fluid medium filled and sealed therein at an absolute pressure not exceeding 7 p.s.i., having an initial thickness at said filling and sealing pressure substantially greater than the space between the outer constraining garment and the surface of the body of the wearer and compressible by pressure greater than the filling and sealing pressure to a thickness less than said space, whereby when the garment enclosing the wearer is exposed to a surrounding pressure substantially equal to or less than the filling and sealing pressure said constraining pressure of said outer garment is transferred through said bladder liner to the outer surface of the wearer's body, and when exposed to exterior increasing pressure substantially above said filling and sealing pressure the gaseous fluid medium sealed in the millicells is compressed to reduce the thickness of said bladder to less than the space between the outer constricting garment and the surface of the wearer's body to relieve the constricting pressure of said outer garment on the surface of the body of the wearer.

10. In a ventilated porous self-contained automatically pressurized space suit for use in normal pressure atmospheres, on the ground, in "shirt sleeve" environments in a space vehicle, and in outer space at very low to minimum exterior pressures comprising, an outer nonexpansible porous flexible form fitting garment fabricated to loosely fit and enclose a wearer in predetermined closely spaced relation to the outer surface of a wearer's body and limbs, a millicell foamed, porous, sponge rubber-like bladder lining disposed between the inner surface of said porous constricting garment and the outer surface of the body and limbs of the wearer having a gaseous filled medium filled and sealed therein at less than 7 p.s.i. exterior pressure to trap said gaseous fluid medium in the millicells thereof at said sealing pressure, said porous liner having a greater thickness in relaxed condition at said sealing pressure than the space between the inner surface of the porous outer constricting garment and outer surface of the body and limbs of the wearer to transfer the confining pressure of said outer garment to the outer surface of the body and limbs of the wearer, when said suit is worn in an exterior pressure equal to or less than said sealing pressure, said bladder lining having a reduced thickness, when the gaseous fluid medium therein is subjected to an materially greater pressure than said filling and sealing pressure to less than the space between the interior of the outer garment and the body and limbs of the wearer, for relieving the constricting pressure of the outer porous garment on the outer surface of the wearer's body and limbs through said liner, for automatically relieving the constricting pressure on the wearer's body and limbs when subject to exterior pressures materially exceeding said filling and sealing pressure, to automatically increase the constricting pressure on the wearer's body and limbs in increasing pressures above said filling and sealing pressures.

11. A porous foamed millicell bladder liner as set forth in claim 10 in which the bladder liner is formed with a multitude of closely spaced small ventilation openings therethrough between the millicells to provide closely spaced ventilation pores between the surface of the body and limbs of the wearer and the outer porous constricting garment.

12. A porous self-contained automatic pressure responsive space suit as set forth in claim 10 including a pressure breathing helmet, said millicell bladder liner having a nonporous chest breathing section comprising a flexible expandable and collapsible breathing compartment therein confined by said outer constricting garment, and a breathing conduit in communication between the interior of the helmet and said breathing compartment for balancing the interior and exterior breathing pressures of the wearer, when said helmet is closed while said wearer is subjected to exterior pressures about equal to or less than said millicell filling and sealing pressures.

13. A suit as claimed in claim 12 in which said breathing compartment is disposed in said foamed millicell bladder between the said ventilation passages thereof, and sealed against the entrance of exterior surrounding air, except the wearer's exhalation and inhalation pressures.

14. A suit as set forth in claim 12 in which said chest breathing section is formed from nonporous millicell material having a gaseous fluid medium filled and sealed therein at said filling and sealing pressure, having a plurality of pressure breathing connected expansible and collapsible compartments formed therein between the chest of the wearer and the constricting outer garment having a communication conduit therefrom connected to the interior of the wearer's breathing helmet.

References Cited

UNITED STATES PATENTS

| | | | |
|---|---|---|---|
| 2,657,396 | 11/1953 | Klein et al. | 128—144 |
| 2,664,566 | 1/1954 | Mianulli | 2—2.1 |

VERLIN R. PENDEGRASS, *Primary Examiner.*